United States Patent [19]

Adams

[11] 3,936,699

[45] Feb. 3, 1976

[54] GROUND FAULT PROTECTIVE CIRCUITRY

[75] Inventor: William H. Adams, Pompey, N.Y.

[73] Assignee: Pass & Seymour, Inc., Syracuse, N.Y.

[22] Filed: Nov. 30, 1973

[21] Appl. No.: 420,654

[52] U.S. Cl................. 317/18 D; 317/27 R; 317/53
[51] Int. Cl.² ......................................... H02H 3/28
[58] Field of Search ........... 317/18 D, 27 R, 33 SC, 317/53

[56] References Cited
UNITED STATES PATENTS

| | | | |
|---|---|---|---|
| 3,731,148 | 5/1973 | Fournis | 317/18 D |
| 3,794,884 | 2/1974 | Sircom | 317/18 D |
| 3,800,189 | 3/1974 | Montz | 317/18 D |
| 3,813,579 | 5/1974 | Doyle et al. | 317/18 D |

Primary Examiner—James D. Trammell
Attorney, Agent, or Firm—Witherspoon and Lane

[57] ABSTRACT

Ground fault detection circuitry for sensing ground fault currents is disclosed. If ground fault occurs in a line conductor(s) in a distribution system supplying AC power to a load, the circuitry senses this ground fault and provides a signal in response to the sensing of the ground fault. The circuitry also senses the grounding of a neutral conductor, or in some systems the shorting of a line conductor by a parallel conductive path and provides a signal in response to the grounding of the neutral or the parallel conductive shorting path. The signals provided by the circuitry in response to these sensed conditions may be used to provide a visual or audible alarm, or may be used to remove power from the load.

9 Claims, 4 Drawing Figures

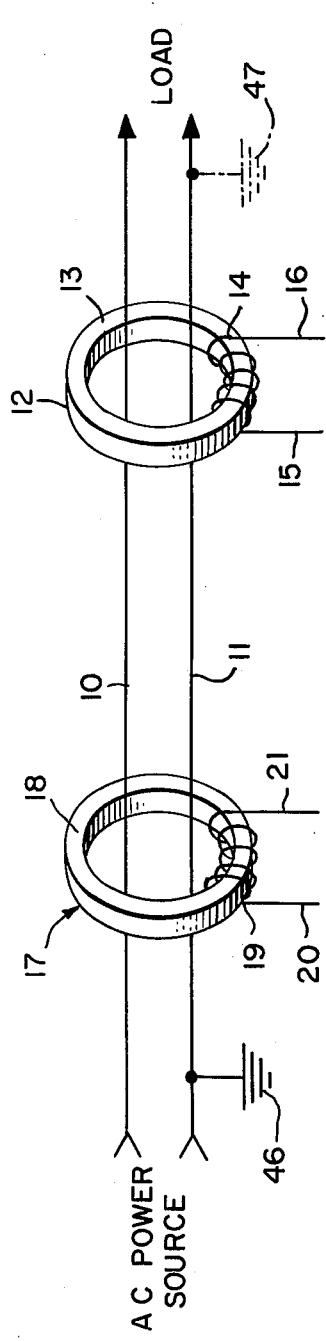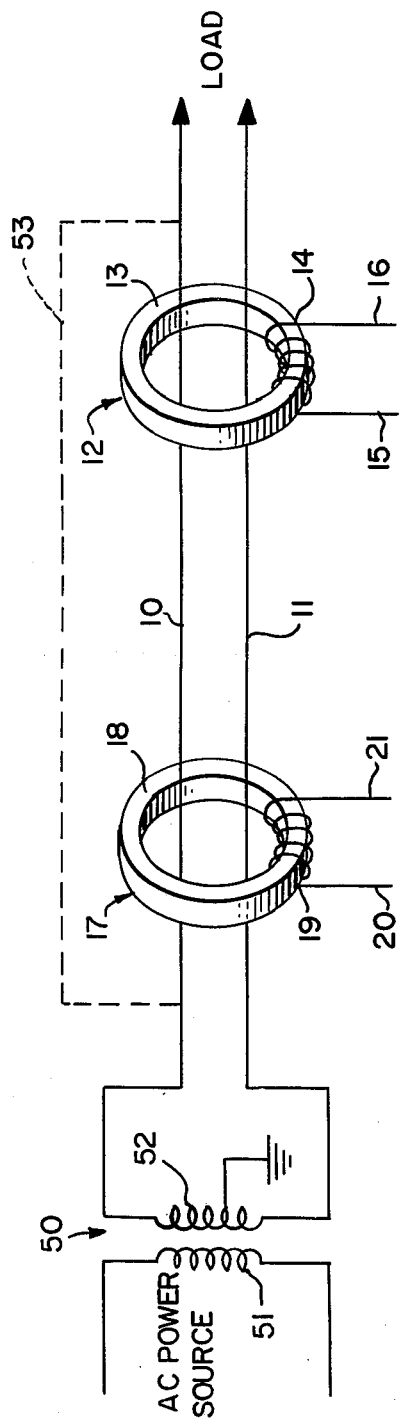

GROUND FAULT PROTECTIVE CIRCUITRY

BACKGROUND OF THE INVENTION

This invention relates to ground fault protective circuitry; and more particularly to protective circuitry for sensing ground fault currents, the grounding of a neutral conductor and the shorting of a line conductor by a parallel conductive path.

In a system supplying electrical power to a load, there is always a danger that a person or animal can receive a lethal shock or be severly injured. Electrical systems supplying power to a load have traditionally been protected by overcurrent sensing devices which open the circuit upon passage of excessive current. Unfortunately, the current level which will cause injury or death to a human being is only a fraction of the current required to trip such devices. Further, property damage can result before these conventional devices have had sufficient time to respond. Of course, such injuries and property damage do not normally occur as the result of normal current flow from a system's energized conductor to its neutral conductor. Instead, they result from the unintentional flow of current from the energized conductor through a person's body or some other path not normally a part of the electrical system, to a grounded conductor other than the system's neutral conductor. Such a current flow is commonly called a ground fault.

Circuits for providing protection against such ground faults are available on the market today. A number of these circuits utilize differential transformers to sense a current unbalance in the conductors of a distribution system providing electrical power to a load, and in response to this unbalance provide a signal to remove power from the load. These available devices have, by and large, operated satisfactorily. However, some of the prior art devices are highly temperature sensitive and become unstable with temperature variations. Also, some of the prior art devices are not sufficiently immune to noise to prevent false triggering in response to noise signals.

Another problem that exists in many of the prior art differential transformer protective circuits relates to the inadvertent grounding of the neutral conductor on the load side. In power distribution systems where the neutral conductor is grounded at the source side, inadvertent grounding of the neutral at the load side may render the protective circuitry ineffective. Several systems that overcome this problem have been developed. For example, U.S. Pat. No. 3,473,091 to Morris, et al. discloses ground leakage differential protective circuitry in which an impedance is inserted in the neutral line to detect a low impedance to ground in the neutral conductor; and U.S. Pat. No. 3,663,865 to Stanback teaches the placing of a resistor across the line and neutral conductor to detect a grounding of the neutral conductor. A third patent, U.S. Pat. No. 3,611,035 to Douglas teaches the use of a tickler coil to induce a high frequency voltage on the neutral conductor to detect a low impedance to ground in the neutral conductor.

This invention provides improved ground fault protection circuitry that overcomes most of the prior art problems. In addition to protecting against ground fault, the circuitry of this invention provides protection against the inadvertent grounding of a neutral conductor on the load side. The protection against the inadvertent grounding of the neutral conductor is provided without the insertion of any additional impedance in the power lines, and without continuously placing a high frequency signal on the neutral conductor.

Of course, not all loads receiving AC power have a neutral conductor; in such systems shorting of a line conductor by a parallel conductive path can present a hazardous condition without any obvious indication that such a short exists. The circuitry of this invention, when used in such systems, detects the shorting of a line conductor by a parallel conductive path. It is also noted that with the protective circuitry of this invention the same basic circuitry may be used to provide ground fault protection plus grounded neutral protection, and ground fault protection plus protection against shorting of a line conductor by a parallel conductive path.

SUMMARY OF THE INVENTION

The invention is specifically described herein with reference to two-wire power distribution system supplying single phase AC power to a load. However, the circuitry of this invention can be used with any three-wire single phase AC system or with any conventional multiphase system, as will be apparent to those skilled in the art.

The ground fault detection circuitry includes a differential transformer having a toroid core or the like. The two conductors pass through the core to the load and form the primary windings of the differential transformer. A secondary winding is wound on the core. The secondary winding is coupled to the input of a current responsive amplifier.

Under normal operating conditions the current flow in the two conductors supplying power to the load is balanced and no voltage is induced in the secondary winding since there is zero net flux in the core of the differential transformer. If a ground fault occurs, the current flow in the two conductors is unbalanced and this unbalance creates a magnetic flux in the core of the differential transformer. This flux produced by the imbalance in current flow makes an alternating current available to the input of the current sensitive amplifier. The amplifier provides an output voltage in response to this signal current. The output voltage may be used to operate a visual and/or audible alarm indicating a ground fault. Preferably, however, this output voltage is used to operate a circuit breaker or the equivalent to remove the power from the load.

In addition to the differential transformer, a second transformer is provided. This transformer may also have a toroid core or the like with the two conductors passing through the core. However, in this case, the two conductors form the secondary of the transformer and the transformer does not operate as a differential transformer. The primary winding of this transformer is coupled to the output of the current amplifier.

If the two-wire power system is one having a neutral normally grounded at the load, the second transformer is used to detect a low impedance to ground in the neutral conductor on the load side. This second transformer does not enter into the operation of the circuitry during a ground fault condition. If the neutral conductor is inadvertently grounded at the load side, this grounding is, in effect, sensed by the second transformer and the amplifier will break into self-sustained oscillations. When these oscillations become sufficiently vigorous, the output voltage at the amplifier which is now an oscillator will become large enough to operate either the warning device or the power removal device, as the case may be. In some power distribution systems where there is no neutral to the load, the second transformer will sense the shorting of the conductors by a parallel conductive path where no current is drawn by the load. If one of the conductors is shorted by such a parallel conductive path, this fact is in effect sensed by the second transformer and the amplifier breaks into self-sustained oscillations, as is the case with the grounded neutral, to provide an output voltage of sufficient magnitude to operate the warning device or the power removal device, as the case may be.

It is therefore an object of this invention to provide ground fault protective circuitry.

It is another object of this invention to provide protection against ground faults in a power distribution system supplying power to a load.

It is another object of this invention to provide protection against a low impedance to ground in the neutral conductor of power conductors supplying power to a load.

It is yet another object of this invention to provide protection against the shorting of a line conductor by a parallel conductive path.

It is a further object of this invention to provide circuitry to protect against dangerous shocks and property damage.

It is a further object of this invention to provide differential ground fault protective circuitry.

It is still a further object of this invention to provide ground fault protective circuitry including protection against the grounding of the neutral conductor on the load side in a power system supplying electrical power to a load.

It is yet a further object of this invention to provide ground fault protective circuitry including protection against the shorting of a line conductor by a parallel conductive path.

BRIEF DESCRIPTION OF THE DRAWING

The above-mentioned and other objects of the invention will become readily apparent from the following detailed description when read in conjunction with the annexed drawing in which:

FIG. 2 is a diagram useful in describing the grounded neutral feature of the invention;

FIG. 3 is a diagram useful in describing the shorting of a conductor by a parallel conductive path.

DESCRIPTION OF THE INVENTION

Figure 1:
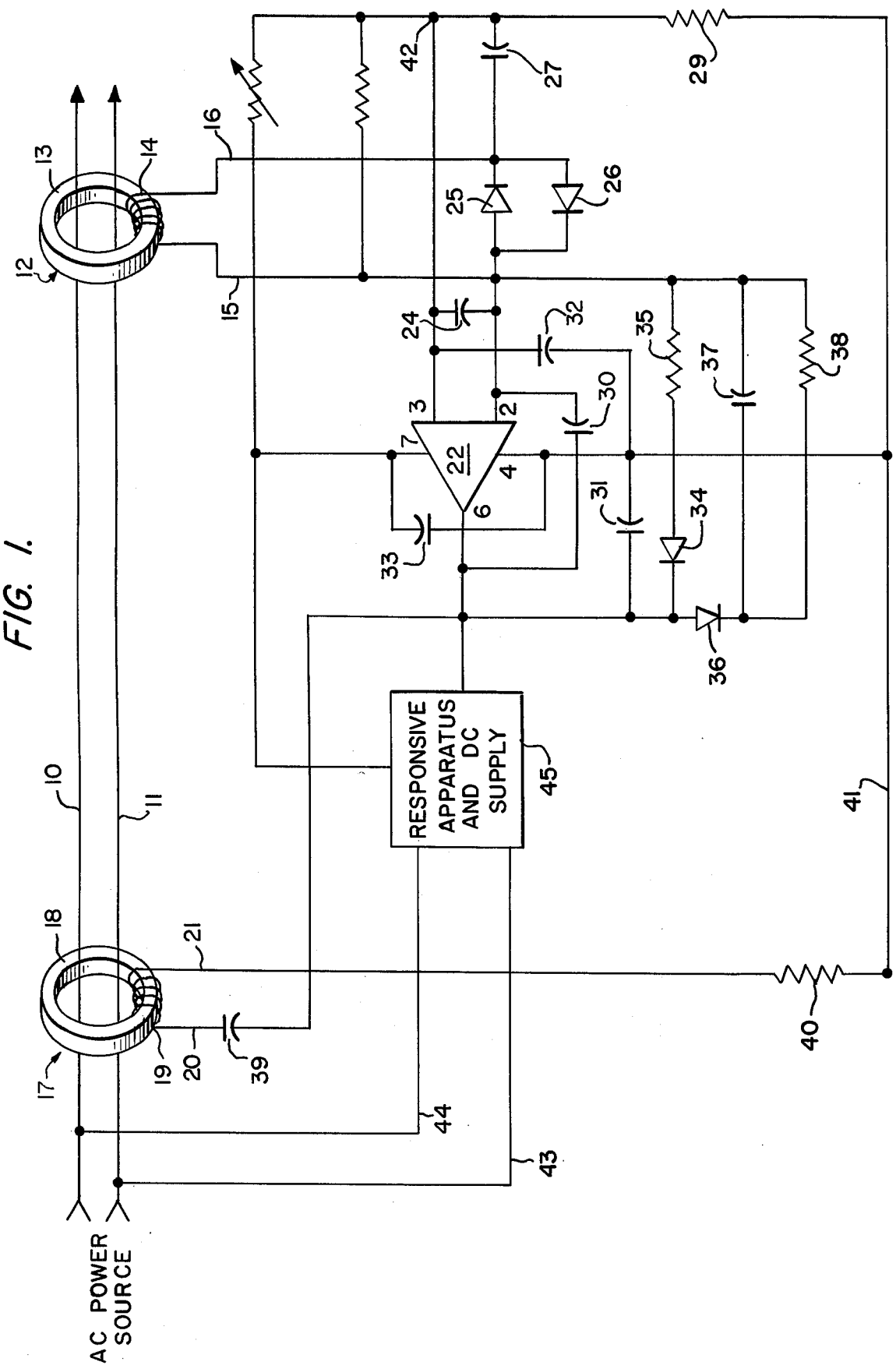
FIG. 1 is a schematic diagram showing a preferred embodiment of the basic circuitry of this invention.

Referring to the drawing, FIG. 1 shows a pair of conductors 10 and 11. An AC power source (not shown) is connected across non-inverting 10 and 11 at non-inverting side as indicated in FIG. 1 point a load (not shown) is connected across conductors 10 and 11 at the right side as also indicated in FIG. 1; of course, the load could be on the left side and the power source on the right side. The power source would typically be 120/240 volts 60 hertz single phase; however, this invention is not limited to these specific voltages or to a 60 hertz single phase AC supply. The circuitry of this invention will function properly with other voltage and frequencies and multiphase systems.

Conductors 10 and 11 pass through a first toroid core 18 and a second toroid core 13. A winding 14 having the leads 15 and 16 extending therefrom is wound on core 13 and a winding 19 having leads 20 and 21 extending therefrom is wound on core 18. Conductors 10 and 11, winding 14 and core 13 form a differential transformer 12. Winding 14 is the secondary and conductors 10 and 11 are the primary of differential transformer 12. Core 18, conductors 10 and 11 and winding 19 form a transformer 17. In transformer 17, conductors 10 and 11 are the secondary and winding 19 is the primary. Note that while cores 13 and 18 are shown as toroid cores, these cores could be square shaped or any other suitable shape. In fact, for transformer 17, core 18 could be a rod with the conductors 10 and 11 wound on the rod.

Lead 15 of winding 14 is coupled to the input pin 2 of an amplifier 22. Amplifier 22 is shown as an operational amplifier and input pin 2 is the inverting input of amplifier 22. Note that while amplifier 22 is indicated as an operational amplifier, a conventional high-gain amplifier may be used for amplifier 22; however, the operational amplifier has been found to operate very satisfactorily. A resistor 23 is connected between lead 15 and a point 42.

A pair of oppositely poled diodes 25 and 26 are connected in parallel with the lead 16 of winding 14 connected to the cathode of diode 25 and the anode of diode 26. A capacitor 27 is connected between this point of the parallel diodes 25 and 26 and the point 42. The cathode of diode 26 and the anode of diode 25 are connected to inverting input pin 2 of amplifier 22.

A capacitor 24 is connected between inverting input pin 2 and the input pin 3 of amplifier 22. Input pin 3 is the noninverting input of amplifier 22. Non inverting input pin 3 is connected to poing 42. In addition to input pins 2 and 3, amplifier 22 is shown as having the pins 4, 6 and 7. Pins 4 and 7 are utilized to apply operating voltages to amplifier 22 and pin 6 is the output of amplifier 22. A capacitor 33 which is a filter capacitor is connected between pins 4 and 7.

A capacitor 30 is connected between output pin 6 and inverting input pin 2. The series combination of the capacitors 31 and 32 is connected between output pin 6 and non-inverting input pin 3 and the series combination of a diode 34 and a resistor 35 is connected between output pin 6 and inverting input pin 2. The parallel combination of a capacitor 37 and a resistor 38 is connected in series with a diode 36 between output pin 6 and inverting input pin 2.

Output pin 6 is also shown connected to a box 45 labeled responsive circuitry and DC power supply. The responsive circuitry can be a visual and/or audible alarm and/or a circuit breaker or the like can be connected either directly to output pin 6 or coupled to output pin 6 through associated circuitry. The DC power supply which supplies a DC voltage to the balance of the circuitry could of course be a battery supply, but is preferably a rectifier system receiving an AC voltage from conductors 10 and 11 as indicated by the electrical leads 43 and 44. A variable resistor 28 is connected between point 42 and box 45 and a resistor 29 is connected between point 42 and a common conductor 41. Pin 7 of amplifier 22 is connected to Box 45 and pin 4 of amplifier 22 is connected to common conductor 41. The circuitry just described forms the basic ground fault circuitry of this invention.

Transformer 17 is utilized to sense grounding of a neutral conductor on the load side or the shorting of a line conductor by a parallel conductive path in some systems where the load does not have a neutral conductor, as will be apparent later. As shown in FIG. 1, lead 20 of primary winding 19 is coupled to output pin 6 by means of a capacitor 39. As will be apparent later, capacitor 39 and winding 19 form a series resonant circuit. Note, however, that a parallel resonant could also be provided, as will be apparent to those skilled in the art. Lead 21 of winding 19 is connected to one side of a resistor 40 which has its other side connected to common conductor 41.

Ignoring transformer 17 for the moment, the operation of the basic ground fault circuitry is as follows: Under normal operating conditions, the current flow through conductors 10 and 11 is balanced and there is zero net flux in core 13. With zero net flux in core 13 there is no voltage induced in secondary winding 14 and therefore no AC input signal current to amplifier 22. The no signal output voltage of amplifier 22 is established by the divider network of variable resistor 28 and resistor 29. Variable resistor 28 is adjusted to vary the quiescent operating point to compensate for component tolerances. Any deviation of output pin 6 from input pin 3 is fed back through the feedback network comprising diode 34 and resistor 35 or the feedback network comprising diode 36 and resistor 38, depending upon its polarity, to input pin 2. This feedback insures that pin 6 closely follows pin 3 under quiescent conditions. Capacitor 27 serves to prevent transformer 12 from shorting out this feedback and resistor 23 serves to supply the necessary bias to input pin 2. Capacitors 24, 31 and 32 bypass harmlessly to ground any high frequency noise voltages that could be applied to amplifier 22 by capacitive coupling and capacitor 30 reduces the amplification of amplifier 22 at frequencies above its normal operating range, further reducing noise pickup.

Assume now that a low level fault occurs; under this condition the current in conductors 10 and 11 is no longer balanced and a flux is generated in core 13 of differential transformer 12. If conductors 10 and 11 are line conductors, such a low level fault will occur if there is any small current leakage between ground and either conductors 10 and 11, or both. If one of the conductors 10 or 11 is a neutral, then a low level fault would be a low level leakage current from the other conductor, which would be a line conductor, to ground.

The AC current in winding 14 due to the low level ground fault is applied to amplifier 22 as an AC input signal. When this signal is first applied to amplifier 22, capacitor 37 has no, or very little, charge. Without a charge on capacitor 37, pin 6 cannot become more positive than pin 2 which is at the quiescent voltage. The charging current for capacitor 37 can only be drawn through differential transformer 12. Thus, the current flowing in winding 14, due to the voltage induced in this secondary winding of differential transformer 12 by the ground fault, provides a charging current for capacitor 37. When the charge on capacitor 37 reaches a given value, the voltage at output pin 6 becomes sufficient to energize the responsive apparatus of box 45.

The responsive apparatus of box 45 could be a horn or any other audio device to provide an audible warning and/or a light or visual indicator to provide a visual warning, and/or the operating coil of a circuit breaker or relay or the like. The circuit breaker or the like would have contacts so arranged that power would be removed from the load. The coil of the circuit breaker could be coupled directly to output pin 6 or to output pin 6 through associated circuitry.

The operation just described is for low level fault currents. The time it takes capacitor 37 to charge to a sufficient value to provide a voltage of such magnitude that will energize the responsive apparatus of box 45 is, of course, related to the value of the current flow in secondary winding 15; and therefor, to the value of the leakage current. At very low level fault currents, for example 4 ma or thereabout, it will take approximately one second for the proper charge to build up on capacitor 37. For such low levels of fault current, the one second response time is sufficiently rapid to provide full protection. As the fault current increases, the charge on capacitor 37 will, of course, build up quicker, therefore, the circuitry responds more rapidly as the fault current increases so that full protection is provided. However, when the fault current increases above a given value, the time that it takes to charge capacitor 37 is such that the response time of the circuitry is not rapid enough to provide a fully satisfactory degree of protection. This does not mean that the circuitry of FIG. 1 does not provide full protection at high level fault currents since the circuit operates in a different mode for fault currents above a given value. At these high level fault currents, the charge time of capacitor 37 is not a limiting factor with respect to the response time of the circuit.

High level fault currents above a given value will drive the point 42 positive, thereby providing a positive voltage at output pin 6. At these high level fault currents, output pin 6 goes sufficiently positive to energize the responsive apparatus. For all practical purposes, output pin 6 is driven sufficiently positive to energize the responsive apparatus immediately upon the occurrence of a high level fault. Thus, at low level fault currents, the circuit responds by means of the charging of capacitor 37; and at high level fault currents, the high current faults enter amplifier 22 through the back door via capacitor 27 to point 42 and pin 3 which is not under the control of the feedback networks. In this manner, the circuitry of FIG. 1 provides full protection at all levels of fault current.

Thus far in the description, little has been mentioned about the function of diode 34 and resistor 35. If amplifier 22 should have a negative output offset, diode 34 and resistor 35 place a compensating charge on capacitor 27 to force output pin 6 to follow pin 2. Also, under fault conditions the positive half cycles fed back through diode 36 and resistor 38 would rapidly charge capacitor 27 were it not for equal negative half cycles through diode 34 and resistor 35. The resistance of resistor 35 must be sufficiently low to insure adequate negative half-cycle current despite the limited negative excursions possible at output pin 6, and must at the same time be sufficiently large to prevent impulse noise which may find its way into amplifier 22 from rapidly charging capacitor 27 negative. This input noise could drive pin 6 upward by a sufficient amount to energize the responsive apparatus.

A feature of the invention that is probably not readily apparent from FIG. 1 is the fact that transformer 12 does not have a loading resistor in the normal sense. Instead, ignoring the relatively low impedance at the lead 16 end of winding 14, transformer 12 loading consists of whichever feedback resistor 35 or 38 is passing current at that time, divided by the open-loop gain of amplifier 22. Since the gain of amplifier 22 is typically several thousand, the apparent load resistance is only a few hundred ohms. The effect of this low impedance is to make the output voltage of transformer 12 virtually independent of its core permeability; therefore, ferrite cores can be used. Also, since the load impedance and hence the output of transformer 12 is low for high-gain amplifiers and higher for low-gain amplifiers, the level at which the responsive apparatus is energized is essentially independent of amplifier gain.

Referring now to FIGS. 1 and 2, FIG. 2 shows the conductors 10 and 11 passing through the cores 18 and 13 of transformers 17 and 12, respectively. In other words, FIG. 2 shows the transformer and conductors of the upper part of FIG. 1; however, in FIG. 2 conductor 10 is a line conductor and conductor 11 is a neutral conductor which is normally grounded at the source side, as is indicated by the ground symbol 46. In FIG. 2, the leads 20 and 21 and 15 and 16 of windings 19 and 14, respectively, are connected to the balance of the protection circuitry, as shown in FIG. 1. FIG. 2 is presented only to specifically show conductor 11 of FIG. 1 as a neutral conductor normally grounded on the source side and to describe the function of transformer 17 when neutral conductor 11 becomes inadvertently grounded at the load side, as indicated by the dotted grounded symbol 47. Thus, for the balance of this immediate description, it will be assumed that conductor 11 of FIG. 1 is a neutral conductor grounded at the source side, as shown in FIG. 2. If neutral conductor 11 should inadvertently become grounded at the load side, as indicated by 47 in FIG. 2, the ground fault circuitry may become inoperative thereby defeating the protective system. However, transformer 17 protects against such grounding of neutral conductor 11.

When the power system is operating under normal conditions, the circuit is in its quiescent mode, as described above. Under these conditions, capacitor 39, transformer 17 and resistor 40 serve no useful purpose. Capacitor 39 does, of course, block DC voltage from transformer 17, but it will pass an AC component to winding 19 of transformer 17 and this AC component will be coupled to conductors 10 and 11. Under quiescent conditions, a few millivolts will be coupled to conductors 11 and 10 in this manner for each volt of AC output at pin 6 of amplifier 22. These few millivolts of voltage coupled to conductors 10 and 11 by the transformer action of transformer 17, produces no current in conductors 10 and 11 since there is no return path.

If by any means a low impedance to ground is established in neutral conductor 11 at the load side, as indicated by the dotted ground symbol 47 in FIG. 2, a return path is established and the few millivolts coupled to conductors 10 and 11 will cause some current flow through the primary of transformer 12. This current flow, due to the few millivolts of coupled voltage, will become large enough to generate in transformer 12 a voltage equal to the voltage at transformer 17 divided by the gain of amplifier 22. In other words, this loop gain becomes unity and self-sustained oscillation will take place. Amplifier 22 becomes an oscillator. The frequency of oscillation is determined mainly by the resonant frequency of the series resonant circuit formed by capacitor 39 and transformer 17. Of course, other resonant circuits could also be provided such as a simple parallel resonant circuit. The oscillations will become sufficiently vigorous if the impedance to ground in neutral conductor 11 is a low impedance which will be the case if conductor 11 becomes grounded, such as shown in FIG. 2 at 47, to charge capacitor 37 to the level required to produce an output voltage at pin 6 of sufficient value to energize the responsive apparatus of box 45. Thus, the circuitry of FIG. 1 provides not only ground fault protection, but also protects against the inadvertent grounding of a neutral conductor. Further, with the circuit of FIG. 1, the dual protection is provided by basically the same circuitry. For ground faults, amplifier 22 operates as an amplifier and if conductor 11 is a neutral conductor, as shown in FIG. 2, the amplifier becomes an oscillator if a low impedance to ground is established in the neutral conductor. It is noted that continuous oscillations are not applied to winding 19 of transformer 17 and thus to conductors 10 and 11. Note that resistor 40 prevents excessive ringing at amplifier 22.

Referring now to FIGS. 1 and 3, many power distribution systems do not have a neutral conductor going to the load in the fashion shown in FIG. 2. A system that does not have a neutral to the load is shown in FIG. 3. For systems such as that shown in FIG. 3, the circuitry of this invention provides protection against a shorting of the conductors by a parallel conductive path. Referring specifically to FIG. 3, AC power is supplied to a load through a transformer 50. Transformer 50 has a primary 51 and a secondary 52. Secondary 52 has a center tap to ground. Conductor 10 is connected to one end of secondary 52 and conductor 11 is connected to the other end of secondary 52. In FIG. 3, only the conductors 10 and 11 and the two transformers are shown since the circuitry connected to leads 20 and 21 of winding 19 and the circuitry connected to leads 15 and 16 of winding 14 is the same as that shown in FIG. 1.

If power is applied to the load in FIG. 3 and the system is operating normally, the protective circuit is, of course, operating in its quiescent condition. If by some means a parallel conductive path should inadvertently be established between the source and load as indicated by the dotted line 53, the protective circuitry of FIG. 1 will function in the manner described above for ground faults provided current is being drawn by the load. This should be obvious since the current flow in conductors 10 and 11 will no longer be balanced and a flux will be established in core 13 of differential transformer 12. Thus, the type of short represented by dotted line 53 presents no problem if current is being drawn by the load.

The problem that arises is when a parallel conductive path such as represented by dotted line 53 occurs when there is no current being drawn by the load, such a short could occur without any indication that a parallel conductive path has been established. Assume that the AC source is connected to primary winding 51 and that the load is not drawing current; if a parallel conductive path is inadvertently established and one were to come in contact with the conductor represented by dotted line 53, current could be drawn from conductor 53 through the person's body to ground and since there is no normal current flow through conductor 10 and 11, the ground fault detection circuitry would not detect this event. However, transformer 17 will detect this event since a return path is now established for the few millivolts induced on conductors 10 and 11. The operation of the circuitry is the same as described above for the shorting of a neutral conductor to ground on the load side. The parallel conductive path 53 is shown only with respect to conductor 10, the protection against such a parallel shorting path holds for either or both conductors 10 and 11. Note also that in absence of such an inadvertent parallel shorting path, the circuit provides protection against the shorting of conductors 10 and 11 to ground even when no current is drawn by the load.

If a voltage is present on secondary 52 and the load is not connected to conductors 10 and 11, no current will be drawn through conductors 10 and 11. If, however, one of the conductors 10 and 11 should become grounded, current would flow through that conductor and the circuitry of FIG. 1 would operate as described above for ground faults since a flux would be generated in core 13 of differential transformer 12. Thus, even if no current is being drawn by the load in the system of FIG. 3, the protective circuitry of this invention will provide protection against the grounding of either or both conductors 10 and 11, even in the absence of a parallel conductive path such as represented by dotted line 53.

Figure 4:
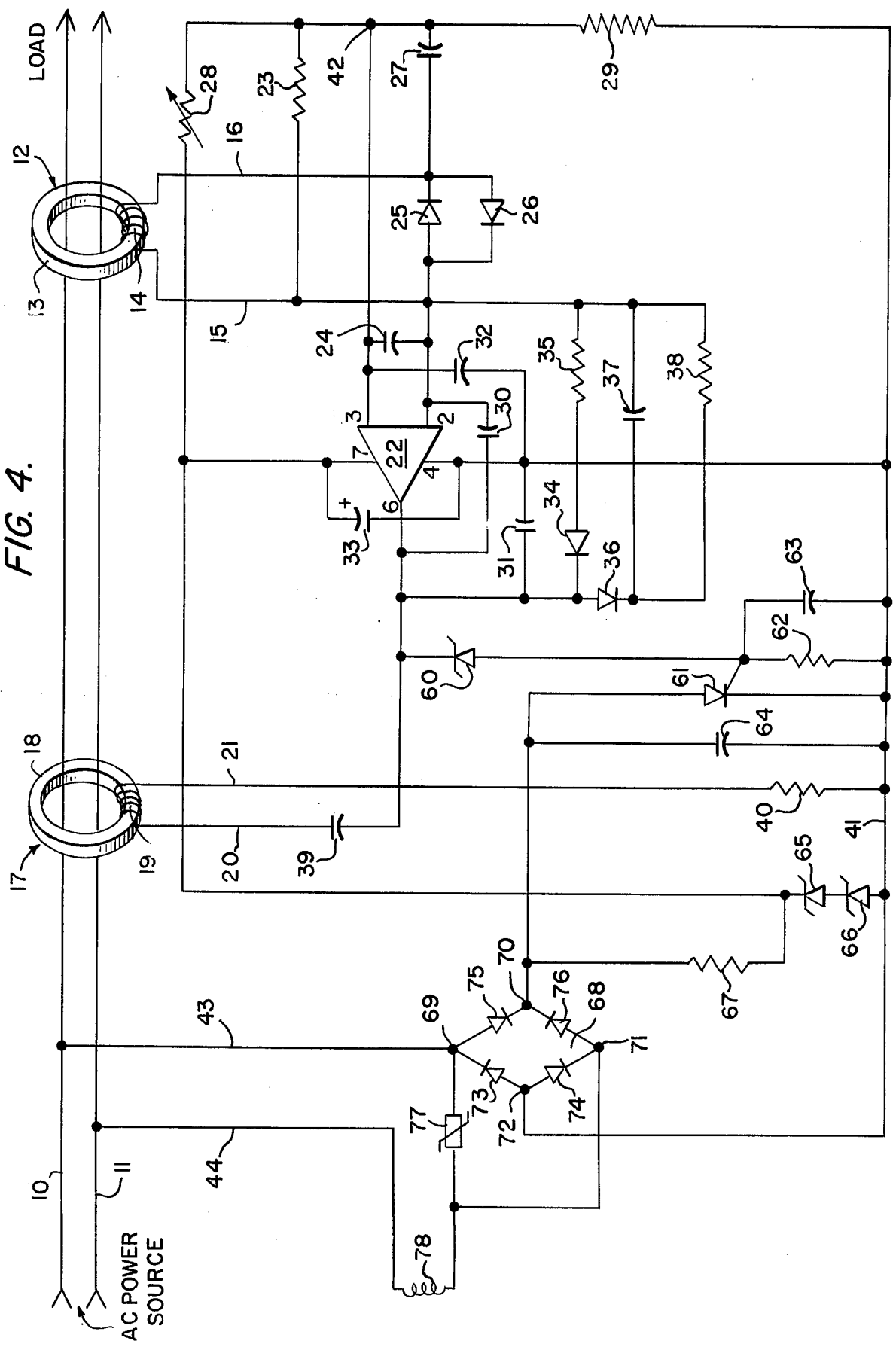
FIG. 4 is a schematic diagram showing the basic circuitry of this invention in addition to a DC power supply and other specific circuitry that may be utilized with the basic circuitry.

As was mentioned above, the responsive apparatus and DC power supply of box 45 of FIG. 1 could be any suitable responsive apparatus and any suitable DC supply. However, in order to prevent a possible injurious shock it is preferable to use a circuit breaker or the like to remove the AC source; and since an AC voltage is present, it is preferable to use a rectifier for the DC power with the AC from conductors 10 and 11 serving as the input to the rectifier. A highly satisfactory circuit arrangement that has been used for the responsive apparatus and the DC supply is shown in FIG. 4. For purposes of clarity, FIG. 4 contains all the circuitry of FIG. 1, in addition to the circuitry for the responsive apparatus and the DC supply.

Referring specifically to FIG. 4, the DC supply comprises a full wave diode bridge rectifier 68 and the related circuitry shown in FIG. 4. Bridge rectifier 68 comprises the diodes 73, 74, 75 and 76 and the bridge points 69, 70, 71 and 72.

Bridge point 69 is connected directly to conductor 10. A resistor 67 and a pair of Zener diodes are connected in series between bridge point 70 and common conductor 41. Zener diodes regulate the DC supply current drawn through dropping resistor 67. Note that capacitor 33 connected between pins 4 and 7 of amplifier 22 serves as a filter capacitor to reduce ripple. Resistors 28 and 29 which form a voltage divider are coupled between the cathode of Zener diode 65 and common conductor 41. Pin 7 of amplifier 22 is also connected to the cathode of Zener diode 65.

A varistor 77 which is coupled between bridge point 71 and bridge point 69 serves to protect diodes 73 through 76 from high voltage transients. Bridge point 72 is connected to common conductor 41.

The responsive appratus of box 45 comprises, in FIG. 4, a Zener diode 60, a silicon controlled rectifier 61 (SCR), a circuit breaker coil 78 and the related circuitry.

Zener diode 60 is coupled between output pin 6 and the gate electrode of SCR 61. The parallel circuit of resistor 62 and capacitor 63 is coupled between the gate electrode of SCR 61 and common conductor 41. The anode of SCR 61 is connected to bridge point 70 and its cathode is connected to common conductor 41. A capacitor 64 is connected across SCR 61. Coil 78, which is the coil of a circuit breaker or the like (contacts not shown) is coupled between conductor 11 and the common point of varistor 77 and bridge point 71.

Varistor 77 which protects the diodes of rectifier 68 from high voltage transients also protects SCR 61 from these transients. Capacitor 64 connected across SCR 61 protects SCR 61 from high transients when SCR 61 is gated on. Resistor 62 serves to bypass any leakage that might build up on capacitor 63 and turn on SCR 61. When SCR 61 is turned on capacitor 63 serves to hold it on during zero crossings.

Now that the components of FIG. 4 not shown in FIG. 1 and their circuit connections have been described, the operation of this circuitry will be described. The operation of the diode bridge rectifier, the regulating components and transient protection components is obvious. The rectifier, of course, supplies internal DC power and Zener diodes 65 and 66 regulate the current drawn through resistor 67. Varistor 77 and capacitor 64 provide transient protection.

When the power system is operating normally, the protective circuitry is in its quiescent state. In this state, Zener diode 60 is non-conducting and SCR 61 is also non-conducting. When SCR 61 is not conducting, coil 30 is not energized and therefore the circuit breaker or the like is not tripped. The breaker contacts (not shown) can be connected in conductors 10 and 11 at any point along conductors 10 and 11; for example, between the load and transformer 13 or immediately before transformer 17 or between transformers 17 and 12.

If a ground fault occurs, or if the neutral conductor becomes grounded as described with reference to FIG. 2, or if a parallel conductive path short occurs as described with reference to FIG. 3, the voltage at output pin 6 will rise as described above with reference to these three occurrences. The voltage at output pin 6 will rise to a value sufficient to break down Zener diode 60 and gate on SCR 61. When SCR 61 is turned on it shorts out rectifier 68 and sufficient current is then drawn through coil 78 to trip the circuit breaker or the like. The circuit breaker, relay or the like is preferably of the latch-out type so that once tripped it must be manually reset eventhough the system returns to normal operation.

The circuit shown in FIG. 4 has been constructed and has operated very satisfactorily. In the circuit constructed coil 78 is a circuit breaker coil, and amplifier 22 is an operational amplifier. For this circuit, typical operating parameters for low level and high level faults as described above with reference to FIG. 1 are as follows: For low level faults between 4 to 40 ma, the protective circuitry operates by the charging of capacitor 37. For faults between 40 to 90 ma, the protective circuitry may operate by the charging of capacitor 37 or through the back door as described previously. For fault currents above 90 ma the operation is always through the back door. When a fault occurs, the voltage at output pin 6 rises and when it reaches approximately 17.5 volts, Zener diode 60 will break down and SCR 61 will be gated on. In the case of a grounded neutral on the load side, as described with reference to FIG. 2 or the parallel conductive path as described with reference to FIG. 3, amplifier 22 will oscillate at a frequency of between 2–3 Khz. This frequency is determined mainly by the resonant frequency of the resonant circuit. These oscillations become sufficiently vigorous to cause the voltage at output pin 6 to reach the 17.5 volts necessary to break down Zener diode 60 and gate on SCR 61 to thereby energize coil 78. The foregoing values are given as typical values only to show typical operating currents and voltages for the circuitry of FIG. 4 and, of course, FIG. 1. Changing or varying of any of the circuit elements will, of course, change these currents and voltages accordingly. Therefore, the specific currents and voltages are to be considered as typical only, and not as limiting.

From the foregoing description, it should be apparent that the basic circuit of this invention provides protective circuitry that has a high degree of noise immunity. It will be recalled that various capacitors in the circuit are used primarily to provide noise immunity. Note the responsive circuitry of FIG. 4 is also relatively noise immune. The element that could most adversely be affected by noise is SCR 61; however, any noise build up on capacitor 62 is discharged by resistor 62. Further, the diodes of rectifier 68 and SCR 61 are protected from large transients which could be noise transients by varistor 77.

In addition to noise immunity, the basic circuitry of FIG. 1 is highly temperature stable due partly to the fact that the effect of temperature variations on some of the components is generally offset by the effect of temperature variation on other components. For example, as the inductance of transformer 12 drops with lowered temperature, a greater portion of its inductive reactance is cancelled by the capacitive reactance of capacitor 27 which increases slightly at low temperatures. Also, the forward threshold of diode 36 increases at low temperatures, thereby allowing pin 6 to exceed the voltage of pin 3 by a larger value for a given charge on capacitor 37 and, thus, increasing sensitivity. However, if the responsive circuitry of FIG. 4 is used, this increase in sensitivity is offset by the increase in the gate threshold of SCR 61 at low temperatures. Of course, other circuitry could be provided that would offset this increase in sensitivity if such an increase rendered the basic circuitry too sensitive. Note also that since the point at which the responsive apparatus (in FIG. 4 Zener diode 60 and SCR 61) is tripped or energized is independent of the gain of amplifier 22, as described above, this amplifier makes no significant contribution to the temperature coefficient. Thus, the basic circuitry of FIG. 1 is highly temperature stable and the overall circuitry of FIG. 4 is also temperature stable since the basic circuit is temperature stable. In addition, the Zener diodes used in the circuitry of FIG. 4 are highly temperature stable and in both the basic circuit and in the balance of the circuitry of FIG. 4, highly temperature stable resistors are used. The above factors relating to temperature stability are not given as a thorough discussion of the temperature coefficient of the basic circuit or the basic circuitry plus the DC supply circuitry and responsive circuitry of FIG. 4, but only to illustrate some of the factors that provide temperature stability. Those skilled in the art will be readily aware of the temperature stability of the basic circuitry in addition to the temperature stability of the entire circuit of FIG. 4 from but a brief analysis of the effects of temperature variation on the various components. In addition, actual operation of the basic circuit and the overall circuitry of FIG. 4 have shown that these circuits are in fact highly temperature stable and noise immune.

While the invention has been described with reference to a specific embodiment of the basic circuitry and with reference to a specific embodiment of the basic circuitry plus specific circuitry for the responsive apparatus and the DC supply, it will be apparent to those skilled in the art that various changes and modifications can be made to these specific embodiments without departing from the spirit and scope of the invention as set forth in the claims. Further, it should be apparent to those skilled in the art that the protective circuitry, while specifically described with reference to two-wire distribution systems, can be used with conventional three-wire single phase systems or with conventional multiphase power distribution systems.

What is claimed is:

1. A protective system for use in an electrical system having at least a first conductor and a second conductor extending from a source of alternating current to a load, said protective system comprising:
   a. a transformer having a core, a primary on said core and a secondary formed by said at least first and second conductors;
   b. an amplifier;
   c. means to couple the output of said amplifier to said primary of said transformer; and
   d. means including said transformer for causing said amplifier to break into self-sustained oscillations upon the occurrence of a given event relating to said at least first and second conductors.

2. A protective system as defined in claim 1 wherein said given event is the establishing of a parallel conductive shorting path across at least one of said at least first and second conductors.

3. A protective system as defined in claim 1 wherein one of said at least first and second conductors is a neutral conductor grounded at the source side of said electrical system and said given event is the establishment of a low impedance to ground in said neutral conductor on the load side of said electrical system.

4. A protective system as defined in claim 2 wherein said means for causing said amplifier to break into self-sustained oscillations also includes a differential transformer having a core, a primary formed by said at least first and second conductors and a secondary on said core, said secondary being coupled to the input of said amplifier.

5. A protective system as defined in claim 3 wherein said means for causing said amplifier to break into self-sustained oscillations also includes a differential transformer having a core, a primary formed by said at least first and second conductors and a secondary on said core, said secondary being coupled to the input of said amplifier.

6. A protective system as defined in claim 2 wherein responsive means is coupled to the output of said amplifier, said responsive means responding to the voltage developed at the output of said amplifier when said amplifier breaks into self-sustained oscillations.

7. A protective system as defined in claim 6 wherein said responsive means is a circuit breaker coil coupled to the output of said amplifier.

8. A protective system as defined in claim 3 wherein responsive means is coupled to the output of said amplifier, said responsive means responding to the voltage developed at the output of said amplifier when said amplifier breaks into self-sustained oscillations.

9. A protective system as defined in claim 8 wherein said responsive means is a circuit breaker coil coupled to the output of said amplifier.

* * * * *

Disclaimer 3,936,699.—*William H. Adams*, Pompey, N.Y. GROUND FAULT PROTECTIVE CIRCUITRY. Patent dated Feb. 3, 1976. Disclaimer filed Feb. 29, 1980, by the assignee, *Syracuse Electronics Corporation*, a subsidiary of *Pass &Seymour, Inc.*

Hereby enters this disclaimer to all 9 claims of said patent.

[*Official Gazette, April 8, 1980.*]